Aug. 16, 1966 W. H. KING, JR 3,266,291
PIEZO CRYSTAL FLUID ANALYZER
Filed Oct. 29, 1962 6 Sheets-Sheet 1

William H. King, Jr. INVENTOR

BY David A. Roth

PATENT ATTORNEY

Aug. 16, 1966　　　W. H. KING, JR　　　3,266,291
PIEZO CRYSTAL FLUID ANALYZER
Filed Oct. 29, 1962　　　　　　　　　　6 Sheets-Sheet 2

William H. King, Jr.　INVENTOR

BY David A. Roth

PATENT ATTORNEY

Aug. 16, 1966 W. H. KING, JR 3,266,291
PIEZO CRYSTAL FLUID ANALYZER

Filed Oct 29, 1962 6 Sheets-Sheet 3

William H. King, Jr. INVENTOR

BY *David A. Roth*

PATENT ATTORNEY

William H. King, Jr. INVENTOR

FIGURE 10
WATER CALIBRATION OF ANALYZER

United States Patent Office 3,266,291
Patented August 16, 1966

3,266,291
PIEZO CRYSTAL FLUID ANALYZER
William H. King, Jr., Florham Park, N.J., assignor to Esso Research and Engineering Company, a corporation of Delaware
Filed Oct. 29, 1962, Ser. No. 233,671
3 Claims. (Cl. 73—23)

This application is a continuation-in-part of Ser. No. 110,189, filed May 15, 1961, now U.S. Patent 3,164,004.

This invention relates to new and improved detection devices, analyzers utilizing such detection devices, and methods and techniques utilizing the foregoing. In particular, the invention relates to coated responsive materials and analyzers containing such coated materials to analyze certain specific fluid materials, usually gases.

The selective detection of gas compositions is of great importance in industry. For example, in gas chromatography it is necessary to determine the composition of the effluent. In addition, many analyzers have wide use, as in determining water in fuel; water and/or $H_2$ in powerformer feed; $CO_2$ in exhaust, flue gas, and carbon analysis; and $SO_2$ and $SO_3$ in sulfur analysis. Other areas of application include analysis of $H_2S$, aromatics, olefins, and paraffins. These uses are of particular interest in the petroleum industry. Some other uses and applications of the instant invention will appear subsequently in the specification. Many other uses and applications will be apparent to one skilled in the art.

In the copending parent case it was found that piezoelectric materials when coated with a substrate are selectively sensitive to changes in their environment and can serve as detection devices for use in analyzers. For example, piezoelectric materials will exhibit different vibrational frequencies and amplitudes depending on the amount of material and the particular material which interacts with a substrate. Thus, the detection device in an analyzer can measure composition by sensing its own weight change.

In brief, one embodiment of this invention relates to analyzers which use two detection devices, at least one of such detection devices containing a substrate selective to a particular material. The net output of the two detection devices is a measure of the interaction of at least one component to be detected with the substrate. By detection devices is meant a responsive material. Usually the responsive material will have a substrate, but not necessarily so. If two detection devices are used in an analyzer then at least one of said detection devices has a substrate, usually both. If only one detection device is used in an analyzer then it will always have a substrate.

The basic principle of a detection device to be used in an analyzing apparatus is set forth in Serial No. 110,-189, now U.S. Patent 3,164,004. While the entire disclosure of said copending application is incorporated herein by reference, so much of it will be repeated as is necessary to understand the present invention and to conform to the requirements of a continuation-in-part application.

Briefly, an analyzer having a detection device measures fluid, e.g. gaseous compositions, by responding to the amount of material that selectively interacts with its substrate. The substrate is coated on a responsive material. When the responsive material, either with or without a substrate, is placed in a suitable oscillating circuit it will vibrate at a particular, natural frequency. The oscillation changes as the weight of material which interacts with the substrate changes. It is the change in oscillation that can be measured and serves as the basic analytical tool. The change in oscillation can be either in frequency or amplitude or other measurable change.

One preferred analyzer of the invention consists of a detector-oscillating-circuit and a reference-oscillating-circuit. The detector-oscillating-circuit has a detection device with a substrate selective to a component to be detected. The reference-oscillating-circuit has a detection device with either no substrate on the responsive material or a substrate not selective to the material to be detected. The net output from both oscillating circuits is an audio signal which can be heard in an earphone. The operator or other person turns a calibrated dial to either null out the audio signal or match it with a known fixed frequency. Either the known fixed frequency or zero frequency is referred to as a match point. This turning causes the dial to indicate the concentration of the material to be selectively analyzed.

Specifically, a simple device has been invented which can be used as an analyzer for substances such as water vapor at concentrations as low as 1 p.p.m. at ambient temperatures.

In brief, the device consists of two oscillator circuits, one a reference-oscillator-circuit and the other a detector-oscillator-circuit. In each oscillator circuit there is a responsive material, preferably a piezoelectric crystal. In at least one oscillator circuit the responsive material has been coated with a substrate. The responsive material per se or the responsive material having a substrate are referred to herein as detection devices. Connected to the combined output of both oscillator circuits is an indicating means, preferably an aural indicating means such as an earphone. Attached to a variable circuit element, such as a variable condenser, in the circuit of either the reference-oscillator-circuit or the detector-oscillator-circuit is a dial which is calibrated in terms of concentration of the material that is being analyzed, for example, water. The variable circuit element, e.g. condenser, is used anywhere in the circuit so as to change the natural frequency of the responsive material, e.g. crystal, when the circuit element's value is changed. Simple ways to do this are to place the variable circuit element in series or in parallel with the responsive material. For instance, the use of a variable condenser is a simple way to change response, e.g. frequency change, but it should be realized that a variable resistance, inductance and/or other circuit elements could be employed with almost the same degree of simplicity and effectiveness.

In a preferred operation the output from both oscillator circuits is a mixture of signals of various frequencies. These signals are mixed to obtain a single audio frequency signal, which can be detected by a person having an earphone placed over at least one ear. The audio signal is the difference between two high frequency signals, differing only slightly from each other. Instead of earphones, the signal can go to a light bulb, galvanometer, or other indicating means which will be apparent to one skilled in the art. This does not preclude elaborate indicating means, but one of the advantages of the invention is the simplicity and inexpensiveness of the preferred apparatus. Generally, the fluid which is to be analyzed is contacted with both the detection device in the reference-oscillator-circuit and the detection device of the detector-oscillator-circuit. In some instances the fluid is contacted only with the detection device of the detector-oscillator-circuit. Both oscillator circuits then produce separate signals which are matched off against each other (i.e. subtracted) so that a difference is heard in the earphone.

In an elemental embodiment a variable condenser in either oscillator circuit, preferably the reference-oscillator-circuit, has its capacitance changed by rotating the calibrated dial until a listener hears no signal. At this point the dial reading is observed. This dial reading is calibrated so as to be a measure of the concentration of a particular material, i.e. water in the fluid sample.

An improved embodiment of the invention is somewhat more accurate than that described above. In the improved embodiment, the frequency of the oscillators is not necessarily matched off to zero frequency, but is matched off to an arbitrary fixed frequency. Thus, a suitable match point can be any audio frequency as well as zero frequency.

The apparatus of the embodiment which uses an arbitrary frequency match point has an audio oscillator, a crystal oscillator, or another suitable oscillator attached to the earphone. In a preferred operation this oscillator is set at a fixed frequency, for example, 1000 c.p.s. The reference oscillator and detector oscillator are allowed to oscillate. The ears will hear the net audio signal from these oscillations as well as the fixed match point oscillation, e.g. 1000 c.p.s. Thus, the ears hear two signals having different frequencies. The dial on the variable circuit element in either the reference-oscillator-circuit or the detector-oscillator-circuit is turned until the net output from the reference-oscillator and the detector-oscillator is 1000 c.p.s. The ears will then hear the two signals as a single signal having a frequency of 1000 c.p.s.

The setting of the dial at this point is considered to be the zero setting. The detection device of the detector-oscillator is then allowed to contact the fluid to be analyzed. After such contacting the net output from the detector-oscillator and the reference-oscillator is no longer 1000 c.p.s. The dial is rotated until the ear hears just one signal. This is the 1000 c.p.s. signal. The dial reading is interpreted in terms of the concentration of the particular fluid component which was to be analyzed.

The invention can be fully understood by referring to the description herein and the claims taken in conjunction with the accompanying drawings wherein:

Figure 1:
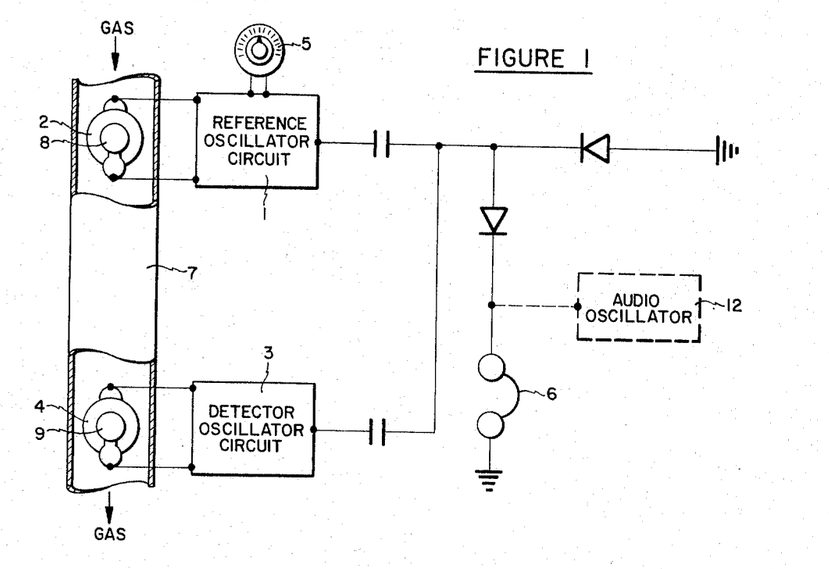
FIGURE 1 is a block schematic with circuit elements shown, where necessary, of a preferred embodiment of the invention.

Referring now to FIGURE 1, reference-oscillator circuit 1 is shown with a piezoelectric crystal 2. Detector-oscillator circuit 3 is shown with piezoelectric crystal 4. Attached to a variable condenser in reference-oscillator circuit 1 is dial 5. The net audio output from reference-oscillator circuit 1 and detector-oscillator circuit 3 is received in earphone 6. Fluid, usually gas, is passed through conduit 7 over crystals 2 and 4. There need not be a separate conduit for the crystals. The whole apparatus can be placed in the environment which is to be analyzed.

In operation, the piezoelectric crystal 2 has applied to it a polystyrene coating, i.e. substrate 8, and piezoelectric crystal 4 has applied to it a sulfonated polystyrene coating, i.e. substrate 9. As the gas which, for the purpose of this embodiment, contains water vapor, passes over crystals 2 and 4 (which crystals can also be referred to as detection devices) the two oscillator circuits 1 and 3 are oscillating at the natural frequency of the crystal with the substrate thereon.

The output from both oscillator circuits is a radio frequency signal and the signal outputs of oscillator circuit 1 and oscillator circuit 3 are matched against, i.e. subtracted from, each other. As water vapor partitions into the sulfonated polystyrene substrate 9 and comes into equilibrium with such substrate 9, the frequency signal from detector-oscillator circuit 3 changes. This change results in a noticeable audio signal at earphone 6.

Dial 5, which has been calibrated in terms of water concentration and which is attached to a variable condenser in reference-oscillator circuit 1, is turned until no audio signal is heard in earphone 6. At the point where no audio signal is heard, the reading on dial 5 is observed and for this particular embodiment this reading is a measure of the quantity of water vapor in the sample.

Audio oscillator 12 is also shown in FIGURE 1. It is enclosed in dotted lines to indicate that its use is optional. As pointed out above this audio oscillator can be set to any desired frequency to serve as an arbitrary match point.

The particular substrates can be changed as desired to obtain analyzers capable of selective analysis of many other materials besides water. It is preferred for consistent readings that the temperature environment of the crystals remain approximately constant. As a practical matter ambient temperatures can be assumed to be constant thus obviating any need for temperature control means.

A particularly preferred oscillator circuit for use in either the reference-oscillator circuit or the detector-oscillator circuit of FIGURE 1 is obtainable from the International Crystal Mfg. Co. as the TRO-3 oscillator. The particular oscillator circuit is a transistorized one with printed connections where possible. It is illustrated schematically in FIGURE 2.

Figure 2:
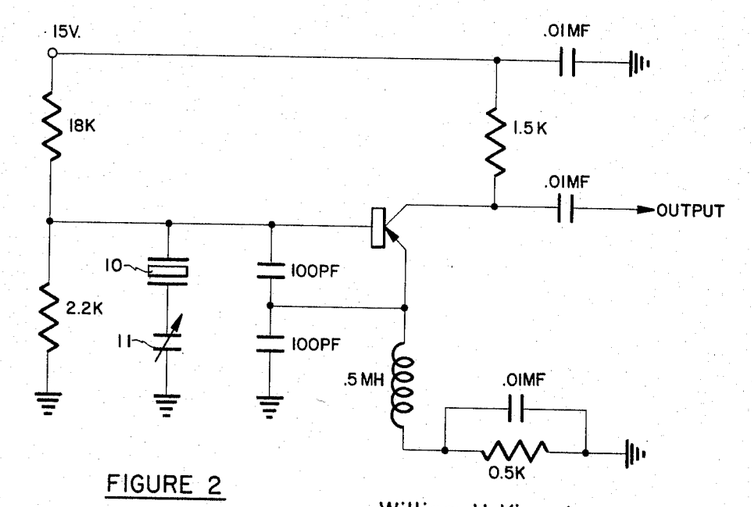
FIGURE 2 is a typical oscillation circuit which can be used in the analyzers of the invention.

A piezoelectric crystal is shown schematically as element 10 and for the purposes of this illustration it is assumed that this is the reference-oscillator circuit and, therefore, has a variable condenser which is shown as element 11. This variable condenser is the one attached to dial 5. The detector-oscillator circuit can have either a fixed or variable condenser in the place of condenser 11. If desired, the dial can be placed on condenser 11 of the detector-oscillator circuit. The resistances are given in terms of kilohms, the capacitances in terms of microfarads (mf.) or picofarads (pf.). (One picofarad is equal to one $\mu\mu$farad.) The operating voltage is 15 v. as indicated.

Although the embodiment illustrated in FIGURES 1 and 2 above is that of a particularly preferred and convenient embodiment of the invention, it will be understood that numerous modifications and variations can be made and still be within the contemplated scope of the invention.

In the event that it is desirable to measure changes in the frequency of vibration, other appropriate circuits well known in the art may be employed. In addition, it should be emphasized that the particular type of oscillator circuit within which the crystal is placed is not critical. There are many such oscillators which may be used, for example, the Hartley oscillator and its many modifications, the tuned grid-tuned plate oscillator, the Dynatron oscillator, the transitron oscillator, and many forms of other feedback oscillators. If amplitude measurement is desired it can be accomplished by measuring the rectified grid current in the oscillator circuit. If transistor oscillators are used, the amplitude of vibration is indicated by collector current or base bias voltage. The choice of the oscillator depends on the particular stability requirements and naturally affects the sensitivity of the detection apparatus. The necessary modifications of oscillator circuits required to secure high efficiency and stability are well within the knowledge of those skilled in the art.

It is apparent that the technique and concept described above for measuring the change in signal of a certain substrate-coated, responsive material as contrasted to a reference responsive material, can be applied to many, many different types of fluid, e.g. gaseous, mixtures for detection. A particularly unique concept in analysis is that of "differential analysis." For instance, if the detector detection device is less sensitive to paraffins than aromatics and the reference detection device is equally sensitive to both aromatics and paraffins, then a fluid, e.g. gas, containing aromatics and paraffins can be easily analyzed for aromatics alone.

To do this the sensitivity of the reference and detector detection devices are adjusted so that they both have an equal response to paraffins. This can be done electrically with attenuators or by adjusting the amount of substrate on the crystals. When the outputs of the two devices are subtracted the net signal is due to aromatics since the paraffin signals cancel out. In a similar way, paraffins can be detected in the presence of aromatics by adjusting the aromatic signals to equality.

This is an extremely important concept since there can be situations where a substrate is not easily available or even known, that is, selective to a particular desired component to be analyzed. Naturally, this principle can be widely applied and it will be apparent to one skilled in the art having the benefit of this disclosure how to accomplish many difficult analyses. For purposes of simplicity this extremely significant concept is called "differential analysis."

A particular, preferred embodiment of this invention is an apparatus which is admirably suited as a water analyzer. For many years there has been a substantial industrial and laboratory need existing for apparatus to measure very small concentrations of water in various fluid streams. For instance, in powerforming it is very important to have extremely dry hydrogen in the recycle streams. Therefore, it would be quite advantageous to utilize water analyzers to monitor the plant stream and determine if the drying equipment is operating properly. Another example is in polymer plants where it is important to maintain certain water levels so that the catalyst, such as phosphoric acid catalyst, is maintained in active condition. In plants where there are water driers, such as those made of absorbents, their operation could be improved by having some way of rapidly determining when water breakthrough took place or the time it took for water breakthrough to occur. In addition there are many civilian and military needs for water analyses.

This problem has been recognized and there have been many attempts to develop water analyzers. A typical or popular type is the electrolytic hygrometer. This unit operates satisfactorily in extremely clean streams but it is disadvantageous since it is limited to the range of 1 to 1000 parts per million of water, it has a slow response at low concentration ranges, and it cannot be used to measure low level of water in hydrogen streams. Moreover, this type of unit requires a large amount of maintenance and personalized attention.

A preferred embodiment of the present invention is the water analyzer which uses a piezoelectric crystal as a responsive material for both oscillator circuits. The detection device of the detector-oscillating-circuit has a sulfonated polystyrene as the active substrate. The detector device in the reference-oscillating-circuit is a polystyrene which is not sulfonated. Other good substrate materials when water is to be detected include ion exchange resins, molecular sieves, silica gel, alumina, and many other hydrophilic substances. The preferred materials to be used on the responsive material for the detection device of the detector-oscillating-circuit for water detection are sulfonated solid and liquid polymers of vinyl aromatics including vinyl benzenes having 1 to 6 vinyl groups per benzene molecule, preferably divinyl benzenes and especially preferred, styrene.

Methods of applying the substrate, e.g. a polystyrene to a responsive material, e.g. a quartz piezoelectric crystal, are as follows.

A water-soluble, noncrosslinked, high molecular weight, sulfonated, polystyrene polymer (sodium salt form) was prepared by a published technique. Details of the preparation may be found in preprints of the Division of Polymer Chemistry, A.C.S., volume 1, #2 pages 140–146, 1961, by Albin F. Turbak. A thin film of this polymer was applied to each detector oscillator crystal from a water solution using a small camel's hair brush. The films had a thickness of 0.01 to 5 microns and an average weight of about 1 to 500 micrograms per square centimeter. After drying, the frequency change or other change in oscillation on applying the substrate is measured to give an indication of how much substrate was applied.

After coating the crystal, it was sealed in a metal holder and flushed with dry methyl alcohol to remove oil film and fingermarks, etc. The substrate of this detection device can be destroyed with liquid water in excess amounts. Therefore some care must be taken but this is not an important problem.

Another substrate material, which is also a sulfonated polystyrene, was prepared by manufacturing it on the crystal surface. A thin film of polystyrene was applied to the crystal surface with a paint brush using a benzene solution of the polystyrene. After this film dried the crystal was alternately exposed to dilute dry $SO_3$ gas and then room air. The $SO_3$ gas was obtained by bubbling air through fuming sulfuric acid.

By this method a very thin film of fuming sulfuric acid formed on the surface of the polystyrene converting the polymer into the sulfonate. The amount of $SO_3$ gas to be used is empirically determined depending on film thickness and quantity. The preferred detectors were made with three exposures of five to 10 minutes of the $SO_3$ gas using room air exposures of five to 10 minutes between the $SO_3$ treatments. After sulfonation, the crystal was washed in water to remove excess acid and flushed with alcohol to remove all foreign material.

Detection devices prepared by manufacturing the desired substrate on the responsive material are not destroyed by flushing with liquid alcohol or water.

There is a wide variety of other materials, particularly ion exchange resins available which can be used as substrate materials. It is difficult to coat crystals with these resins because they are insoluble in most known solvents. However, some successful detection devices were prepared by using glue. An ion exchange resin was first ground to a very fine powder and applied to a crystal which was previously coated with a thin film of polystyrene. The crystal was then held close to a hot soldering iron in order to melt the polystyrene and cause the powder to stick to it. Normally, enough powder will stick to the polystyrene when it cools to make a satisfactory detector.

The preferred coating technique employed on reference-oscillating-circuit detection device crystals for use in water analyzers is as follows. After a detection device crystal for the detector-oscillating-circuit has been made and dried, its absolute frequency is measured. The corresponding reference detection device for the reference-oscillating-circuit is then prepared by coating pure polystyrene on a new crystal until the frequency of the reference-oscillating-detection device matches the detector detection device within a few hundred cycles. In all crystal coating methods it is important to make a reasonably uniform film. Nonuniform films result in crystals which are difficult to maintain in a stable oscillation condition. Frequency shifts up to a hundred kilocycles may be obtained using polystyrene, and the ability of the crystal to oscillate will not be impaired providing a uniform film is applied. The uniformity of polystyrene films can often be improved by heating the crystal in a horizontal position at 600° F. for about one minute.

Figure 3:
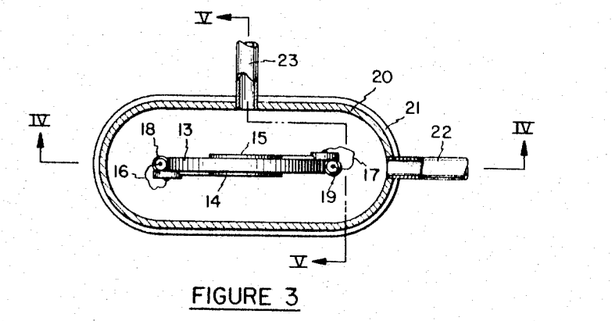
FIGURES 3, 4 and 5 are views of a piezoelectric crystal and its housing which can be used in the detection devices and analyzers of the invention.
Figure 4:
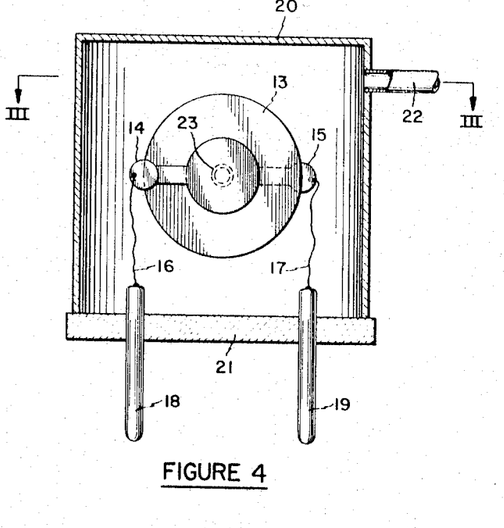
Figure 5:
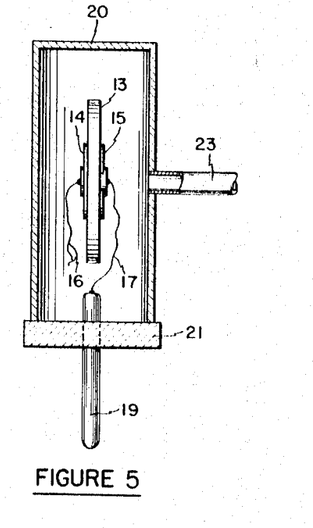

Turning now to FIGURES 3, 4 and 5, cross-sectional views of a particular housing and crystal which may be used in the instant invention are illustrated. The crystal which is about 1.2 centimeters in diameter and about 0.016 centimeter thick quartz is represented on the drawings by the numeral 13. The electrodes contact opposite faces of the crystal and are represented by numerals 14 and 15. Wires 16 and 17 connect the electrodes to pins 18 and 19, respectively. These pins serve to connect the crystal to the particular oscillator circuit. The crystal and electrodes are sealed within housing 20. This housing has a volume of about 2.5 ml. and is sealed at the base by ceramic insulator 21. The outside dimensions of the housing are 18.5 mm. in width, 8 mm. in depth, and 17.5 mm. in height. The pins 18 and 19 have an outside diameter of 0.05 inch and are spaced 0.486 inch apart. A gas inlet 22 is provided and an outlet 23 for circulating the particular gas which is to be analyzed. The particular material which the housing 20 is composed of can be any of numerous materials as long as it is unreactive with the gaseous composition to be passed therethrough and is capable of making the enclosure airtight as to the outside atmosphere.

Figure 6:
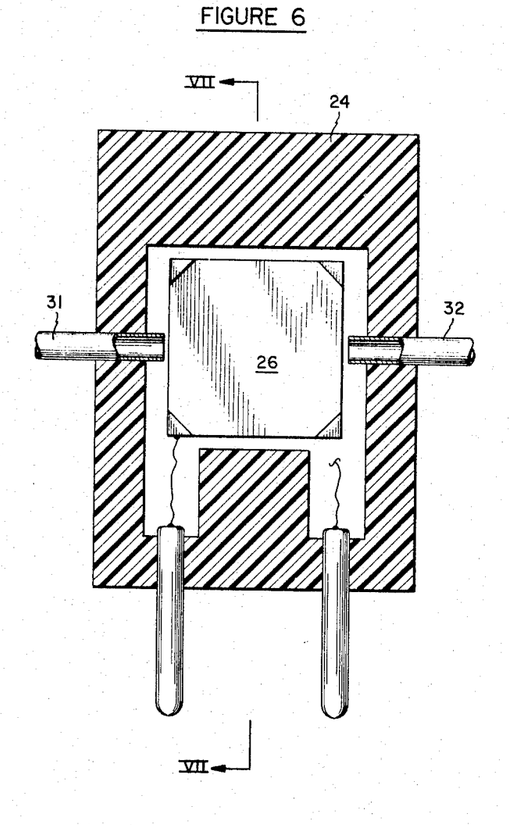
FIGURES 6 and 7 are views of a pressure mounted, corner clamped, piezoelectric crystal which can be used in the detection devices and analyzers of the invention.
Figure 7:
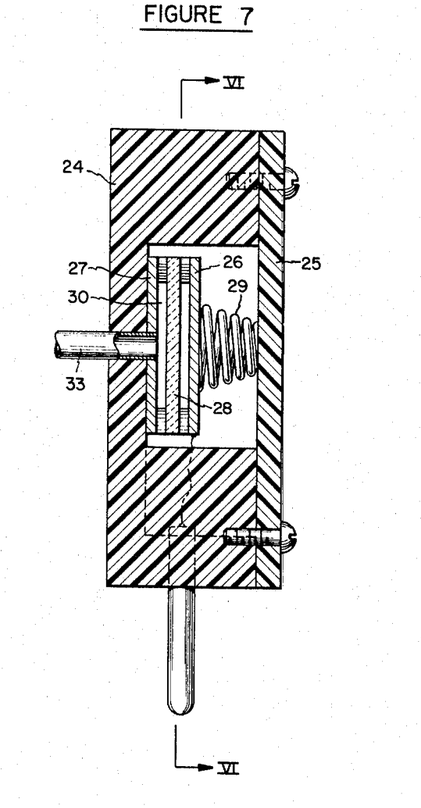

FIGURES 6 and 7 illustrate a front and side section of a pressure mounted corner clamped crystal used for low volume detectors. These detectors are particularly useful in kinetic studies as will be brought out subsequently. The unit is essentially composed of a Bakelite holder 24 and a front cover 25 fastened thereto. Within the area bounded by the holder 24 and the cover 25 are located a front and rear electrode 26 and 27, respectively, and a quartz crystal 28. The two electrodes sandwich the crystal and are held in place by a spring 29. The volume of the detector is that area between the electrode 27 and the crystal and is indicated by the numeral 30. The external dimensions of the Bakelite holder are width, 20.7 mm.; depth, 11 mm.; and height, 28.8 mm. Rear and side gas tubes are indicated by the numerals 31, 32 and 33.

While the above-described crystals and mounting units have been found satisfactory for use in the instant invention, it should be clear that many other types available and known to the art would be equally satisfactory. Briefly, the essential factors are that the responsive material be provided with electrodes and that an area be defined wherein the fluid, e.g. gas, to be analyzed may be confined without danger of dilution to the outside atmosphere.

The particular "responsive material" which may be employed in accordance with this invention is defined as any material which exhibits piezoelectric properties.

The material exhibits piezoelectric properties if, when subject to mechanical pressure, it develops an electrical potential and vice versa, when subject to an electrical potential, it mechanically deforms. Several such materials are known, for example, crystals such as quartz, tourmaline, and Rochelle salts and other materials such as barium titanate. Quartz is the particular crystal most often employed in electrical application, but the instant invention is not to be limited thereto.

The particular frequency at which the material oscillates is dependent on several factors, for example, the thickness of the material and, in the case of crystals, the particular axis which it was cut along; the electrode structure; the characteristics of the associated circuit; temperature, etc. If it is desirable to have a circuit of extremely high stability, it is often advantageous to maintain the responsive material and its associate parts in a thermostatically controlled oven. Therefore, when using the instant invention, the temperature of the gaseous composition to be analyzed is a factor to be considered so as not to adversely affect the temperature of the crystal.

"Substrate" as used in the instant invention shall be taken to means any thin film or coating deposited in predetermined quantity on the responsive material. The substrate may be either liquid or solid.

The particular substrate employed depends on the function which is must serve. For most practical applications, it should have a reasonably long residence time on the surface of the responsive material. Hence, a low vapor pressure material is desirable but not absolutely necessary since the substrate may easily be replaced.

Of course, the substrate must have the ability to "interact" with the particular fluid e.g. gaseous composition to be detected. The term "interact" as used herein shall be defined to include both chemical and physical phenomena. For example, the gas to be analyzed may react chemically with the substrate or be adsorbed or absorbed therein.

Where the detection is selective for a particular component of the gaseous composition, it is the interaction of the particular constituents with the substrate that affects amplitude and frequency of the vibrating responsive material. Examples of the substrates which would be selected for particular operations are as follows:

| Compounds to be Detected | Substrate |
| --- | --- |
| Hydrocarbons, without regard to compound type. | Squalane (hydrogenated squalene), Silicon oil, Apiezon grease. |
| Aromatics selectively | B-B'-oxydipropionitrile, Sulfolane, Polyethylene glycol-400. |
| Oxygenated Compounds | Dinonyl phthalate, Tide (alkyl sulfonate), Aldol-40. |
| Unsaturated Compounds | Glycerol plus $AgNO_3$, Sulfolane. |
| $H_2O$ | Sulfonated polystyrene, Silica gel, Molecular sieves, Alumina, etc. |
| $H_2S$ | Lead acetate, Silver metal, Copper metal, Anthraquinone-disulphonic acid. |
| Alcohol | Cellulose acetate and similar polymeric materials. |

The amount of substrate employed is a significant variable in the invention. As will be shown later, its volume, thickness, weight, and location on the responsive material are of significance in determining the response of the detector.

The amount of liquid substrate used varies according to the particular liquid but for a liquid like a squalane the amount used is preferably 1 to 100, e.g. 1 to 50 micrograms per square centimeter. Larger amounts can be used but difficulty is then often encountered in maintaining the responsive material in a condition of stable oscillation. The more the substrate, the higher the sensitivity, but stability and time constant become problems. Therefore, the amount is chosen experimentally for a best compromise. With squalane substrate, satisfactory performance is obtained with 5 to 50 micrograms per square centimeter. The substrate is coated on the responsive material so as to form a thin film. It is desirable to evenly coat the surface so as to properly activate the material.

The technique incident to the location of the coating and thickness of the coating on the responsive material will vary to an extent depending on whether the coating (substrate) is a liquid or a solid. It is not necessary to completely coat the responsive material. Nor is it necessary to coat both sides of the responsive material although it can be done under some circumstances without any adverse effects. If the substrate is a liquid and it is placed on both sides of the responsive material then over a period of time it will spread, or creep, over the entire surface of some responsive materials. It is important that the coating, i.e. substrate, be of a reasonably uniform thickness.

It is preferred that the coating or substrate be located at the approximate area, that is, the region or vicinity of maximum oscillation of the responsive material. This is particularly pertinent with solid substrates. Substrates located on portions of the responsive material, which oscillate substantially less than the maximum, contribute little to over-all detection abilities. Since they tend to creep, liquid substrates will usually overlap the area of maximum oscillation and can, if desired, be allowed to cover an entire side. It is possible to prevent creeping of a substrate to areas of a responsive material where an interacting coating, or substrate, is not desired, by coating these areas with a material that the liquid substrate won't wet. Such a material would be preferably inert to the compounds to be analyzed.

The thickness of the substrate can be varied depending on the particular conditions encountered. In general, particularly if the responsive material vibrates in the thickness mode, the total thickness of the substrate will preferably not exceed the thickness of the responsive material. More preferably it will not exceed 35% of the thickness of the responsive material. The important consideration is that the quantity of substrate not to be great enough to seriously impair the response of the responsive material.

If the entire responsive material is coated, as with liquid substrate, then a relatively thin film of substrate should be employed, i.e. preferably from about 0.001 to 1% of the thickness of the responsive material. This is important since, if the entire responsive material is covered with substrate, usually liquid, or there is otherwise too much substrate, the responsive material will be hindered in its ability to respond. It is preferred that the entire crystal not be coated. If it is entirely coated, then it will be preferably a liquid coating.

Covering the entire responsive material can be wasteful of substrate since it is only necessary to apply the substrate on at least one region or area of maximum oscillation. Also some substrates are difficult to apply as, for instance, in the case of the sulfonated polystyrene already described. It would be disadvantageous to try to apply the substrate over the entire responsive material if not necessary.

It forms an additional feature of the invention that it is necessary that the substrate be located only at the region or area on the responsive material of maximum oscillation. Of course, if convenient, some substrate can overlap the area of maximum oscillation but it is important that there be some substrate on the area of maximum oscillation of a responsive material.

The preferred detection device is a responsive material with at least the area of maximum oscillation on one side coated with a responsive material. When only the area in the vicinity of maximum oscillation is to be coated with substrate then the substrate generally will have a thickness of 0.0001 to 30%, preferably 0.001 to 10%, more preferably 0.01 to 2%, and especially preferably 0.01 to 0.5% of the total thickness of the responsive material.

Figure 8:
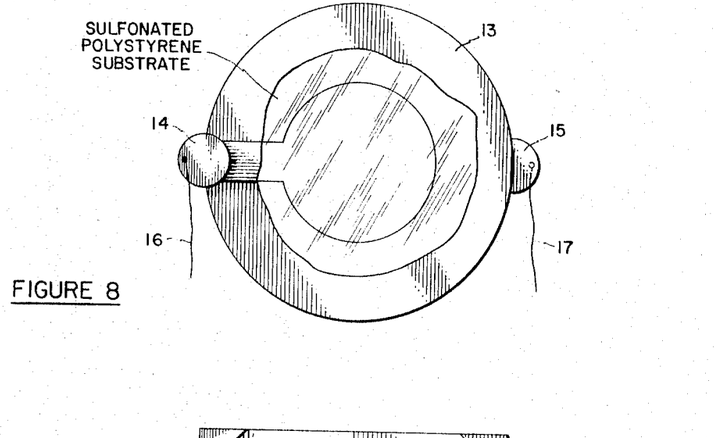
FIGURE 8 is an enlarged portion of the crystal view of FIGURE 4 showing a substrate on said crystal.

The particular areas of maximum oscillation of a responsive material will be apparent to one skilled in the art. For instance, the region of maximum oscillation of the quartz crystal of FIGURES 3, 4 and 5 is where the electrodes 14 and 15 contact the faces of quartz crystal 13. A responsive material of the preferred type made from this particular responsive material would have a substrate located over one of the electrodes. Some of the substrate could extend beyond the borders of the electrode. See FIGURE 8 which is an enlarged portion of crystal 13 and electrodes 14 and 15 showing a preferable location of a solid polystyrene substrate on crystal 13 and electrode 23. The thickness of the coating is approximately 0.2% of the thickness of crystal 13. The coating is on only one side of crystal 13. The weight of the substrate is approximately 50 micrograms per square centimeter.

Figure 9:
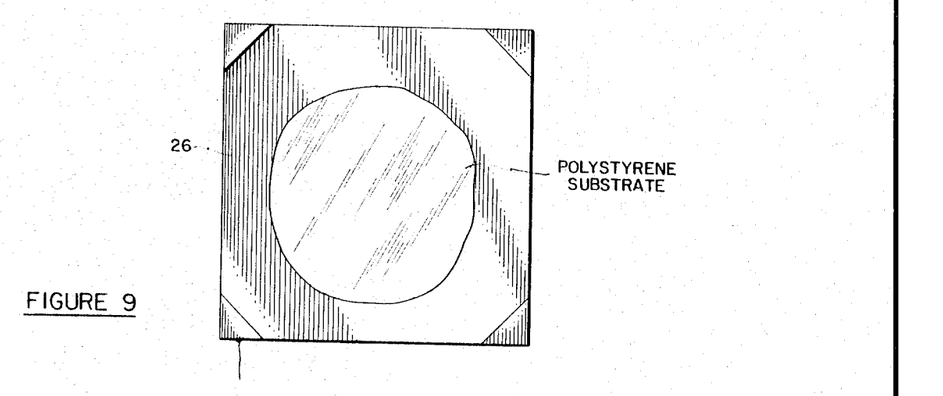
FIGURE 9 is an enlarged portion of the crystal view of FIGURE 6.
Figure 10:
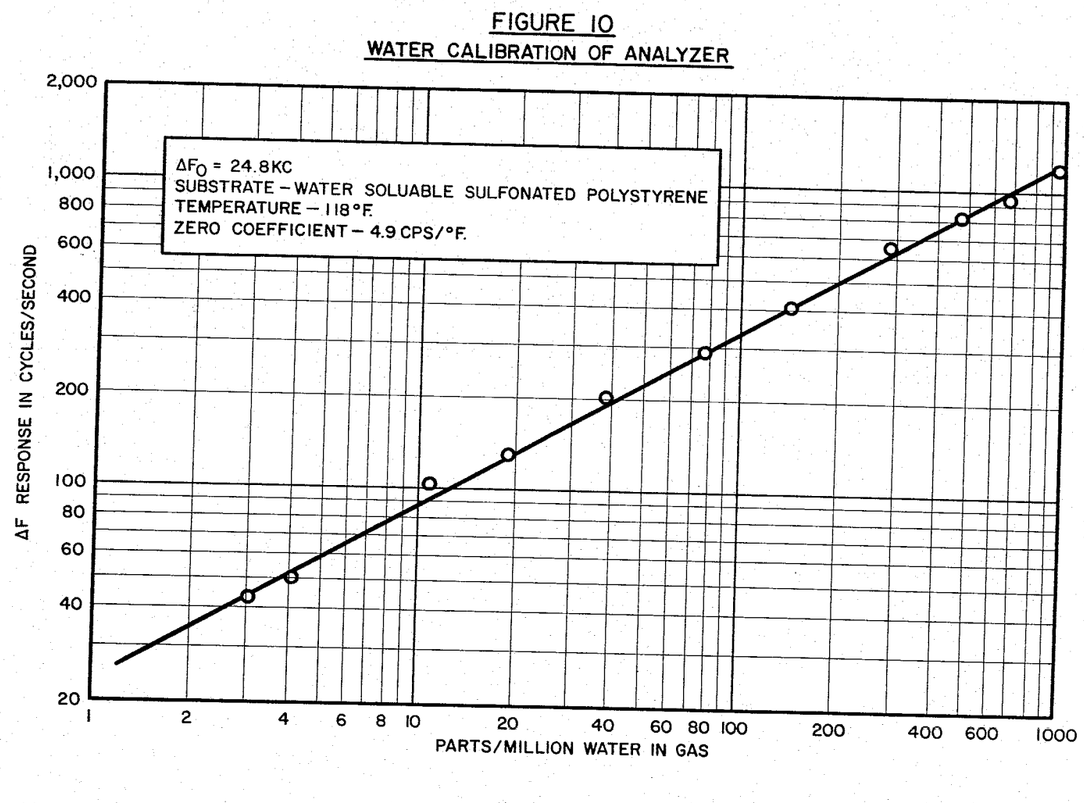
FIGURE 10 is a calibration curve obtained on water-soluble, sulfonated polystyrene.

In another example the maximum oscillation of the corner clamped crystal 26 of FIGURES 6 and 7 would take place in the vicinity of the center of crystal 26. See FIGURE 9 which is a blowup of crystal 26 of FIGURE 5 showing a solid polystyrene substrate coated on said crystal. The thickness of the substrate is approximately 1% of the thickness of crystal 26. The coating is on one side of crystal 26. The weight of this substrate is approximately 150 micrograms per square centimeter.

It will be understood that interaction with the substrate includes and can be a chemical type reaction. In such a case the electrode can be selected so as to serve as both electrode and substrate. For instance, the electrodes can be gold, silver, platinum, steel, etc. or they can be reacted with another substance to form the desired substrate. Or the particular substrate to be reacted with the desired material to be detected can be coated over either the electrode of a responsive material or on the responsive material per se.

If the interaction of the substrate with a particular fluid material is reversible or physical, i.e., adsorption or absorption, the material to be detected preferably comes to equilibrium with the substrate in order to obtain the most accurate measurements. This means that the substance to be analyzed will enter into the substrate which is selective to it. Sometimes this substance will even come into contact with the responsive material or the responsive material and electrode if the crystal is the type which has an electrode. Thin coatings and low weight coatings generally indicate a quick equilibrium and a rapid response time.

In general, except as with the sulfonated polystyrene and solids not easily soluble in ordinary solvents, the method of coating the responsive materials is not critical provided the responsive material remains undamaged after coating. It must oscillate with the coating applied. With liquid, a typical procedure is as follows. Using a microsyringe, a few microliters of a solution of substrate in a volatile solvent are dropped on the surface of the responsive material. When the solvent evaporates, the substrate spreads out slowly and covers the surface uniformly. With squalane, this occurs in two or three days depending on the temperature. Sixteen hours in an oven at 150° F. will also result in an even coating for squalane. Silicone oil (DC–200) is very viscous, but when heated 16 hours at 250° F. uniform coatings are obtained. The time for creeping of liquid substrates is a function of the substrate and the practical waiting time. Squalane is saturated squalene.

Solid substrates of many forms can be applied with cement. Some very fine powders or crystals may be deposited from solutions or suspensions. If the solid is a metal oxide, it is convenient to make the plated electrodes from the desired metal and then convert the surface metal to the oxide form. In addition, many other techniques could be devised by one skilled in the art.

The response of a detection device is mainly determined by the weight of the substrate, the specific retention volume of the substrate and the total volume of the detection device. The following formula approximately describes the detector response and time constant when the amplitude mode of operation is used.

(1)
$$R = K \frac{W V_g}{V + W V_g}$$

(2)
$$T.C. = \frac{V + W V_g}{F}$$

$R=$ Response in percent change in grid current per mole percent solute in carrier gas (percent $\Delta I$ per mole percent)
$T.C.=$ Time constant in seconds
$K=$ Proportionality factor (usually about 1000)
$W=$ Weight of substrate in grams
$V_g=$ Specific retention volume in ml./gm.
$V=$ Volume of detector in ml.
$F=$ Flow rate of carrier gas in ml./sec.

The invention is further illustrated by the following examples.

EXAMPLE 1

An analyzer of the invention with the sulfonated polystyrene substrate as described above was tested with respect to its quantitative response to gases that might be encountered in ordinary commercial use. The detection device was used alone in order to magnify any selection problem encountered.

The test was carried out as follows. An analyzer using only one detection device with a recorder as an indicating means was used in combination with a barium oxide drier. The drier was connected from the detection device and many different discrete gases were passed through the analyzer system. This particular analyzer had a minimum detectable limit of 0.1 p.p.m. water.

The results are summarized in Table I following.

Table I.—*Selectivity of analyzer*

| Dry gas: | Indicated H$_2$O (p.p.m.) |
|---|---|
| 100% air | Base point |
| 100% hydrogen | 0.1 |
| 100% methane | 0.1 |
| 100% ethane | 0.1 |
| 100% ethylene | 0.1 |
| 100% propane | 0.1 |
| 100% isobutane | 0.1 |
| 100% n-butane | 0.1 |
| 200 p.p.m. H$_2$S in air | 0.2 |
| 55% H$_2$, 20% C$_1$, 13% C$_2$, 12% C$_3$ | 0.2 |
| 1.5% ethanol in air | 1.2 |
| 1.0% CO$_2$ in air | 2.0 |

As can be seen by the data in the above table, the sulfonated polystyrene of the detection device is completely insensitive to wide changes in gas composition. The detection device is slightly sensitive to ethanol and CO$_2$ but this is not a serious problem. Thus, the sulfonated polystyrene is extremely selective to H$_2$O as compared with other commonly encountered gases.

EXAMPLE 2

Figure 11:
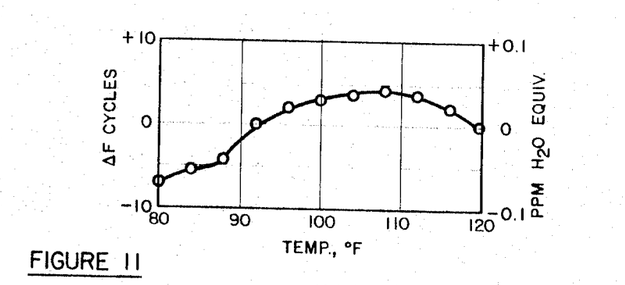
FIGURE 11 shows a graph illustrating the range of temperature compensation.

Using a blending system, flowing gas samples containing from 0.1 to several thousand p.p.m. water obtained. Using this blending device in connection with various analogous water analyzers of the invention, it was found that all the water analyzers of the invention gave the largest signal per p.p.m. at the lowest water levels. A single detector can be used for water concentrations in 0.1 p.p.m. range and cover a very wide dynamic range up to 100% relative humidity which is in the order of 30,000 p.p.m. FIGURE 11 is a typical calibration obtained on water soluble, sulfonated polystyrene. The line is exponential having the approximate equation $$\Delta F = 23\ C^{0.6}$$

where $\Delta F$=the frequency change $C$=the water concentration in p.p.m. The particular conditions used are also given on FIGURE 11. The significance of this example is that sensitivity is excellent at low concentration of H$_2$O where it is particularly desired.

EXAMPLE 3

A dozen or so detection devices which were made with the water soluble, sulfonated polystyrene showed a high degree of consistency when calibrated. The amount of substrate painted on the crystal was determined by measuring the change in frequency from the clean crystal to the painted crystal. This value is called $\Delta F_0$ and is reported in kilocycles. As would be expected, the crystals painted with more substrate shows a higher sensitivity up to the point where oscillation of the responsive material is affected. The average calibration equation is:

$$\Delta F = K(\Delta F_0) \times C^{0.6}$$

$K$=Sensitivity coefficient
$C$=Concentration in p.p.m. water
$\Delta F$=Frequency change in cycles per second due to H$_2$O
$\Delta F_0$=Frequency change in kilocycles per second due to applying substrate The value for K in the above equation was calculated for ten different crystals with different values of $\Delta F_0$ and are shown in Table II below.

Table II

| Detection Device | $\Delta F_0$ | K |
|---|---|---|
| A | 1.5 | 1.26 |
| B | 9.7 | 1.20 |
| C | 30 | 1.20 |
| D | 62 | 1.07 |
| E | 2.6 | 1.20 |
| F | 18 | 1.20 |
| G | 9.7 | 1.30 |
| H | 18 | 1.26 |

The data in the above table show that the sensitivity coefficient is reasonably constant over a fairly wide range of coating thicknesses. This suggests it would be possible to coat a crystal with sulfonated polystyrene and by merely measuring the frequency change when the crystal is coated construct a rough calibration curve for the particular detection device. This sensitivity can be controlled and approximately predicted.

EXAMPLE 4

The weight of material which can be absorbed by a substrate not only depends on the partial pressure but is also dependent on the temperature; therefore, one would expect the analyzer to have a different calibration at a different temperature. The magnitude of this effect is shown in Table III below:

Table III

| Temperature, °F.: | $\Delta F_0 \times K$ Sensitivity coefficient, cycles/sec./p.p.m. |
|---|---|
| 74 | 35 |
| 91 | 16 |
| 120 | 6.4 |

The data in the above table show that the sensitivity will change about a half cycle per second per °F. per p.p.m. Therefore, a simple temperature controller to maintain the detection devices of the analyzer within a few degrees should be adequate for measuring even very low concentrations of water. For a fairly rough approximation, ambient room temperature can be assumed to be approximately constant. But, for extremely precise measurements temperature control is important. Temperatures can be controlled in the vicinity of the detection devices by thermistor type devices and the like.

EXAMPLE 5

The preferred water analyzer uses the beat frequency method of measuring the frequency difference between two detection devices. If both detection device crystals are maintained in the same temperature environment and if both crystals have the same temperature coefficient then it would be expected that beat frequencies are independent of temperature. This was shown to be the case in an experiment designed to show temperature compensation only. Two identical crystals were coated with equal amounts of polystyrene. This caused each crystal to have a temperature coefficient of about −5.8 cycles/sec./°F. The two crystals were placed in duplicate oscillators in the same oven and the frequency difference was measured as a function of temperature from 80° to 120° F. The data are shown in FIGURE 11.

From FIGURE 11 it can be seen that the maximum frequency difference from the highest to the lowest value is 11 cycles per second. Over the entire range of 80° to 120° F. these small changes would represent less than 0.1 p.p.m. water in a typical analyzer.

When H$_2$O detection devices are used the situation is not quite as favorable. The temperature coefficient of H₂O analyzers is more difficult to match. A typical analyzer employs one crystal coated with polystyrene and the other with sulfonated polystyrene. Table IV below shows typical data obtained on the temperature coefficients of single detectors which are either clean, coated with polystyrene, or coated with sulfonated polystyrene. Two analyzers are also shown, one where the reference detection device was poorly matched with the detection device, another where a good match was obtained.

*Table IV*

| Unit | $\Delta F_0$ | Temp. Coeff., cps./° F. |
|---|---|---|
| Clean single | 0 | −1.4 |
| Polystyrene single | 5.6 | −0.5 |
| Polystyrene single | 15.0 | −1.75 |
| Polystyrene single | 64 | −5.75 |
| Detector bad match | 27 | −24.0 |
| Detector good match | 25 | −2.5 |

The crystals used in the above Table IV were all made by the same manufacturer in the same batch. These crystals were designated AT-cut and have a zero temperature coefficient within the tolerance normally accepted in communication work. Actually, the temperature coefficient of clean crystals varies about ±1 c.p.s./° F. from crystal to crystal.

The above table shows that when a detector is coated the temperature coefficient becomes much worse than that of a clean crystal. This is to be expected because the coating materials have much larger temperature coefficients than quartz. A perfect match in detection devices is not required because temperature control ±1° F. in most cases will result in negligible error in the water content.

EXAMPLE 6

The speed of the analyzer is in the order of minutes. In high ranges above 100 or 200 p.p.m. a response time is less than a minute but, in the region of most interest, that is, in the one p.p.m. level, a response speed for 98% is about four minutes. This is extremely fast compared with the electrolytic hygrometer type of water analyzer.

To show this response speed, the following test was made. A CEC electrolytic hygrometer was connected to a dry gas supply with 1000 cc./min. of bypass gas flow which was used to speed up sample line response. An analyzer similar to FIGURE 4 was connected in the bypass line. After dry gas had passed through the CEC hygrometer for several weeks, the indicated water was down to about 2 p.p.m. At this time a gas stream containing 100 p.p.m. of water was switched into the stream for a period of about 5 minutes and then the dry gas returned. Data were taken on both the analyzer of the invention and the electrolytic hygrometer on the basis of p.p.m. water indicated vs. time after switching to the dry gas. These data are shown in Table V below:

*Table V*

| Response, Percent of Dry | Analyzer of Invention | Electrolytic |
|---|---|---|
| 66 | 0.3 min | 6 min. |
| 90 | 1.5 min | 30 min. |
| 95 | 2.4 min | 2+ hrs. |
| 98 | 4.0 min | About 1 week. |

The speed of the analyzer of the invention is most likely determined by the rate of diffusion of water into the substrate. The purge rate of gas through the analyzer does not improve response speed.

This is shown in Table VI below. In order to get a wide range of purge rate, analyzers having different internal volumes and different gas flow rates were employed. Changing the gas purge rate from 3.4 v./v./sec. to 830 v./v./sec. only improved the response time by a factor of two.

*Table VI*

| Flow Rate | | Volume, cc. | Time to Dry |
|---|---|---|---|
| Cc./min. | V./v./sec. | | |
| 500 | 3.4 | 2.5 | 5.7 |
| 100 | 11 | 0.3 | 4.0 |
| 1,000 | 55 | 0.3 | 3.3 |
| 2,000 | 111 | 0.3 | 3.0 |
| 100 | 830 | 0.02 | 2.7 |

Flow rate has essentially no effect on the sensitivity of the analyzer providing there are no leaks in the system. If the flow rate should increase the total pressure in the detector because of restrictions in the line, flow sensitivity will be observed because the partial pressure of water is thereby raised in the detector. Thus, it can be seen that the analyzer of the invention has a very high speed of response and is almost independent of gas flow rate.

EXAMPLE 7

In order to demonstrate "differential analysis" the following experiment was carried out. For instance, as pointed out about "differential analysis" is one of the techniques of the invention wherein, if it is desired to selectively detect A in a mixture of A and B, one detection device having a substrate relatively more selective to B than A is used as the reference and, on the other detection device, a substrate more equally selective to both A and B is used. By a proper choice of substrates and electronics the sensitivity to B can be made to cancel out and the analyzer will selectively detect A. It is clear that this technique has a great value where no substrate can be found that is selective for A alone.

For the purpose of this example it was desired to detect aromatics in the presence of paraffins.

Figure 12:
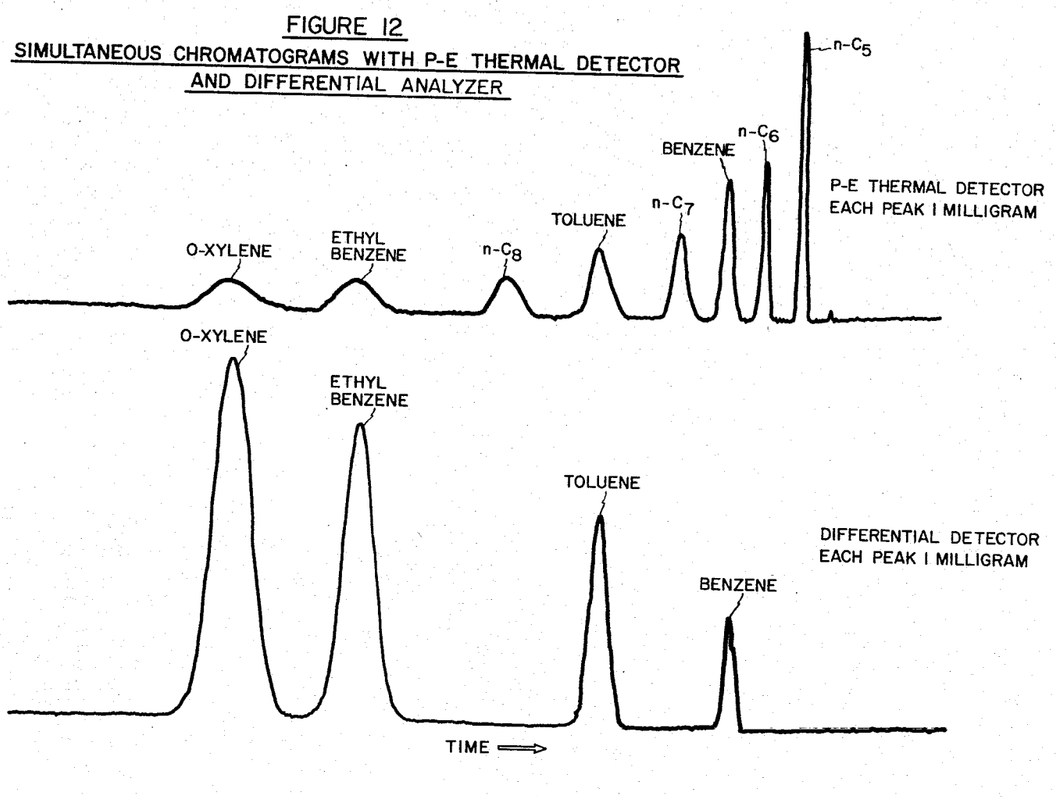
FIGURE 12 shows a pair of twin concentration curves for aromatic detection using a conventional thermal conductivity detector and the analyzer of the invention.

Thus an aromatics "differential analyzer" was constructed by using Dow Corning D.C. 200 silicone oil as the substrate that detects both aromatics and paraffins with about equal sensitivity. Trimetatolyl phosphate was used as the substrate on the detection device that was relatively more sensitive toward aromatics than paraffins. The response from each oscillation circuit containing the two different detection devices was manipulated and adjusted so that the response to paraffins was the same for each oscillator circuit. The output of a gas chromatograph was passed over a thermal conductivity detector first and then over the differential analyzer using the particular substrates as described in the example. The results which are shown in FIG. 12 are those obtained from a simultaneous recording on a two-pen recorder. It should be observed that complete cancellation of paraffins was obtained over a wide molecular weight range.

EXAMPLE 8

In this example quartz crystals similar to the one illustrated in FIGURES 2, 3 and 4 were used. These crystals had a frequency of 9 megacycles and were about 1 cm. in diameter and 0.018 cm. thick. Various quantities of squalane were placed on (1) the center of some crystals, (2) the edge of other crystals, and (3) spread uniformly over one surface of the balance of the crystals. The crystals with various quantities of squalane coated thereon were used to detect 0.2 microliters of normal heptane. The simple analyzer used had a coated crystal, an oscillator circuit and a recorder. The results are tabulated in Table VII which follows in peak area in square centimeters. For this crystal the center was an area on the crystal of maximum oscillation. The weight is in micrograms.

*Table VII.—Signal vs. weight and position of squalane*

| Total Weight (μg.) | Position | Peak Area for 0.2 Microliter-nC$_7$ (cm.$^2$) |
|---|---|---|
| 0 | | 0.76 |
| 5 | Center spot | 19.1 |
| 10 | do | 10.0 |
| 15 | do | 10.0 |
| 20 | do | 47.5 |
| 20 | Edge spot | 0 |
| 12.5 | Spread uniformly | 1.3 |
| 25 | do | 2.6 |
| 50 | do | 16.7 |
| 100 | do | 78.0 |
| 150 | do | 71.5 |
| 200 | do | [1] 60.0 |

[1] Unsteady.

Although not an item in the above table, it was further observed during the course of the experiments that when a drop heavier than 20 μgrams of squalane were placed on the center portion of the crystal, the ability of the crystal to oscillate was noticeably impaired. It will be noted from the data that no peak area was obtained at the edge spot of the crystal. Furthermore, the largest peak area for the uniformly spread squalane appears to be about 100 micrograms of squalane. Readings could still be obtained at 200 micrograms of squalane but these were less reliable than those readings obtained with less squalane.

It should be noted that an oscillator such as audio oscillator 12 of the drawings is usually provided with a dial which can be turned to provide any desired audio frequency. The dial can be turned to match a frequency coming from an oscillator circuit or from two oscillator circuits. This apparatus and method can be used in lieu of the dial attached to a variable element in either one of the oscillating circuits. In sum, when using this technique, the variable element, with a dial attached, of one of the oscillating circuits is eliminated in favor of a dial attached to a variable audio oscillator. The element is retained, but it need not be variable nor does it need the attached dial. The dials referred to herein are preferably calibrated dials.

Although in the foregoing specification some emphasis has been placed on apparatus and techniques for water analysis and paraffin-aromatic analysis it will be understood that numerous other materials can be analyzed using the apparatus and technique so described. Moreover, modifications and variations can be employed in the apparatus and techniques described in the invention without departing from the spirit of the invention as hereinafter claimed.

What is claimed is:

1. In an analyzer comprising in combination, a first detection device having a piezoelectric element bearing a substrate which interacts with one component of a fluid being analyzed; a second detection device having a piezoelectric element which does not substantially interact with said component; a first oscillating circuit means for oscillating one of said detection devices; a second oscillating circuit means for oscillating the other of said detection devices; indicating means to compare the oscillations of said first and second oscillating circuit means whereby the net oscillations are determined; the improvement comprising a variable circuit element operatively connected in one of said oscillating circuit means to change the frequency of oscillation of said oscillating circuit means in response to a change in the magnitude of said variable circuit element.

2. An analyzer as defined by claim 1 wherein said variable circuit element is a variable condenser.

3. In combination with the analyzer of claim 1, an audio oscillator operatively connected to said indicating means establishing a match point for balancing the frequency of said audio oscillator against the frequency of said net oscillations.

References Cited by the Examiner
UNITED STATES PATENTS

| | | | |
|---|---|---|---|
| 1,975,516 | 10/1934 | Nicolson | 73—382 |
| 2,536,111 | 1/1951 | Van Dyke | 73—17 |
| 2,740,032 | 5/1956 | Bouyoucos | 338—34 |
| 3,164,004 | 1/1965 | King | 73—23 |

RICHARD C. QUEISSER, *Primary Examiner.*